July 5, 1949.　　W. LEATHERS ET AL　　2,475,329
LASH-FREE GEAR DRIVING MECHANISM
Filed Feb. 1, 1946　　2 Sheets-Sheet 1
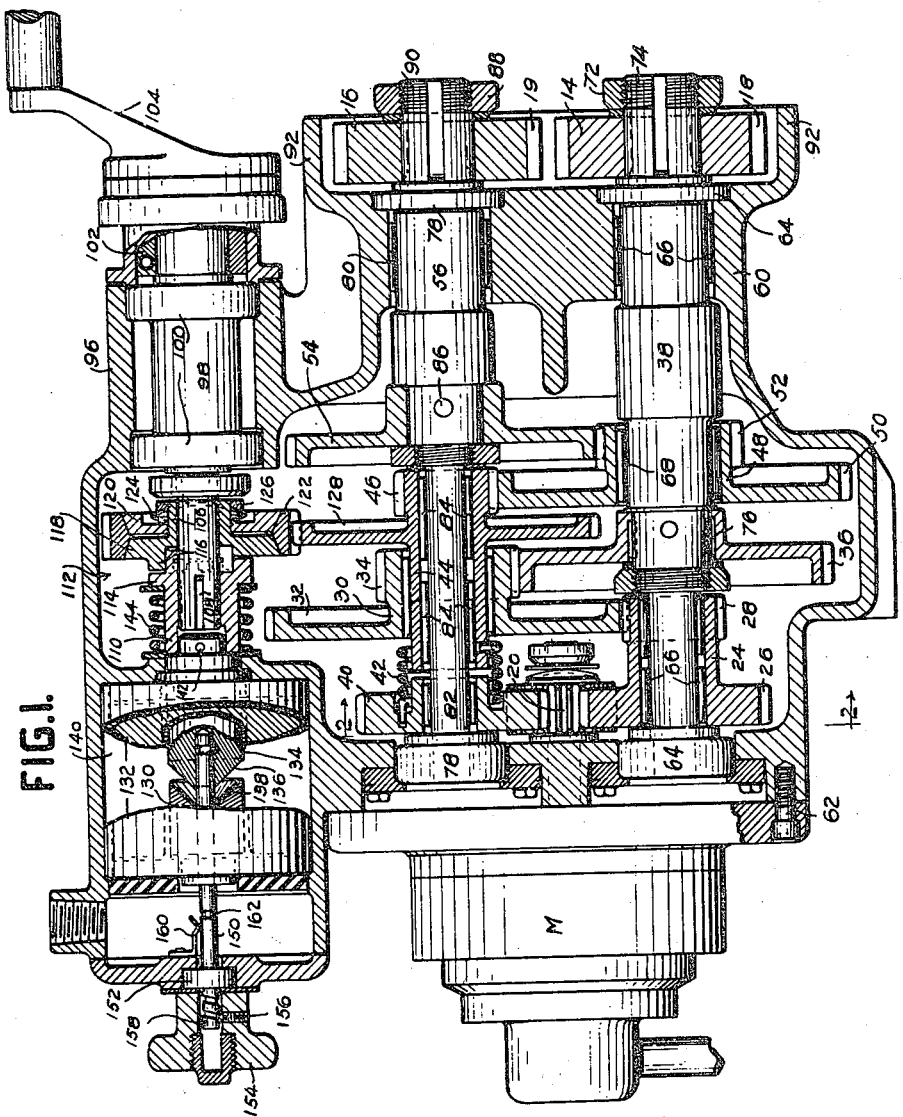
INVENTORS,
Ward Leathers,
Lawrence Bruehl.
BY
ATTORNEY July 5, 1949.   W. LEATHERS ET AL   2,475,329
LASH-FREE GEAR DRIVING MECHANISM
Filed Feb. 1, 1946   2 Sheets-Sheet 2

INVENTORS.
Ward Leathers,
Lawrence Bruehl.
BY
ATTORNEY

Patented July 5, 1949

2,475,329

UNITED STATES PATENT OFFICE 2,475,329

LASH-FREE GEAR DRIVING MECHANISM

Ward Leathers, Brooklyn, and Lawrence Bruehl, New York, N. Y., assignors to International Business Machines Corporation, New York, N. Y., a corporation of New York Application February 1, 1946, Serial No. 644,686

3 Claims. (Cl. 74—407)

The improved lash-free gear driving mechanism comprising the present invention is primarily adapted for use in connection with rotatable armored turrets of the type employed in connection with armored vehicles, such as tanks or the like. The invention, however, is readily adaptable for use in connection with rotatable turrets employed on board seagoing vessels or in aircraft, as well as in stationary installations, if desired. The invention is not limited strictly to such uses and the same may, with or without modification, be employed for a great variety of driving purposes, regardless of the nature of the driven element.

Present-day tanks are almost universally equipped with traction driven turret installations wherein a relatively large ring gear is welded or otherwise mounted directly on the body of the tank hull concentric with the vertical axis of the turret. The turret carries a suitable drive motor and gear reduction device, the driving shaft of which has mounted thereon a gear which meshes with the stationary ring gear mounted on the tank hull. When it is desired to swing the tank in azimuth, either to the left or to the right, operation of the motor in one direction or the other will cause the turret to be tractionally driven in a corresponding direction with the ring gear existing as the basis for the traction. In structures of this character where a single driving shaft and gear are provided on the driving motor, considerable lost motion or play exists between each tooth of the driving gear and the adjacent teeth which it encounters on the ring gear. Where the turret is equipped with delicate and sensitive gun stabilizing equipment, as for example, the electrohydraulic equipment shown in a copending application of Ward Leathers et al., Serial No. 638,394, filed December 29, 1945, any such freedom of play occurring between the driving gear and the ring gear would ordinarily destroy the sensitivity of the stabilizing mechanism.

The present invention is designed to overcome the above noted limitations that are attendant upon the use of conventional turret driving devices and, toward this end, contemplates the provision of a spring-loaded driving gear mechanism including a pair of driving gears, both of which are in constant mesh with the ring gear and one of which is positively driven through a train of gears from the driving shaft on the traction driving motor and the other of which is also driven from the driving shaft of the traction motor, but which has interposed in the gear train mechanism which controls its movements a relatively powerful loading spring. This latter spring is preloaded before the two driving gears are installed and placed in mesh with the turret ring gear and, as a consequence, when the driving gears and ring gear are assembled in meshing relationship one of the driving gears is spring loaded as against the other driving gear in such a manner that regardless of the direction of rotation of the turret there is a tendency at all times for the two gears to tractionally ride away from each other, so to speak, on the ring gear to unload the stored energy of the interposed lash-consuming or take-up spring. The rotational axis of the two driving gears, however, being fixed relative to each other and also relative to the turret, there is no opportunity for the two gears to alter their relationship and, as a consequence, during turret driving operations the two gears are under yielding tension so that all lash in the driving connection is eliminated.

With the arrangement briefly outlined above, if the turret is rotated in one direction, one of the two driving gears will exert upon the teeth of the ring gear a positive pressure, thus driving the turret directly. By positive pressure is meant a direct metallic driving thrust extending all the way back through the gear system to the driven shaft of the turret driving motor. If the turret is moved in the opposite direction the other of the two driving gears will exert a powerful yet yielding pressure upon the teeth of the ring gear to drive the turret, while at the same time the first mentioned driving gear will follow up the motion of the other gear.

The provision of a driving mechanism of the type briefly outlined above being the principal object of the invention, it is another object thereof to provide such a mechanism wherein manually controlled auxiliary turret driving means are provided in the form of a manually operable crank handle, clutch means also being provided whereby during normal power actuated turret driving operations the manual control means is rendered inoperative.

A still further object of the invention is to provide a manual turret drive control mechanism which operates in either direction for turret driving operations and in which provision is made for preventing power controlled or other turret movements from affecting movement of the handle.

The provision of an apparatus of the character set forth above which is extremely rugged and durable and which is comprised of a minimum number of moving parts and which, consequently, is unlikely to get out of order, together with the provision of an apparatus which may be manufactured and assembled at a relatively low cost are further desirable features that have been borne in mind in the production and development of the invention.

Other objects of the invention will be pointed out in the following description and claims and illustrated in the accompanying two sheets of drawings, which disclose, by way of example, the principle of the invention and the best mode, which has been contemplated, of applying that principle.

In the drawings:

Fig. 1 is a sectional view taken substantially centrally through the improved lash-free gear driving mechanism.

Fig. 2 is a sectional view taken substantially along the line 2—2 of Fig. 1.

In all of the above described views like characters of reference are employed to designate like parts throughout.

Figure 4:
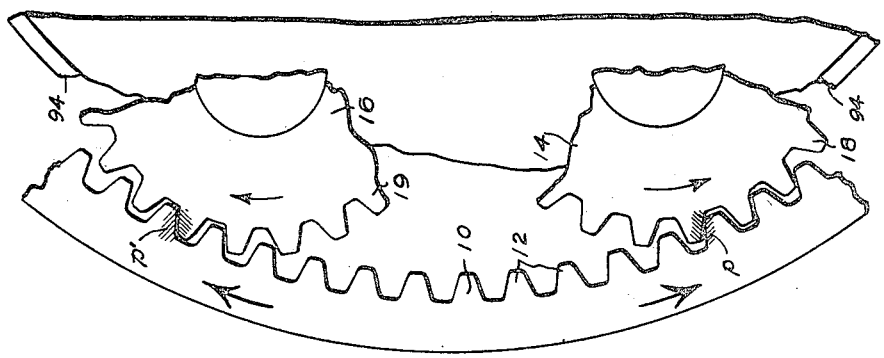
Fig. 4 is an enlarged, detailed, fragmentary, plan view showing a portion of the turret ring gear and driving gears therefor.
Figure 3:
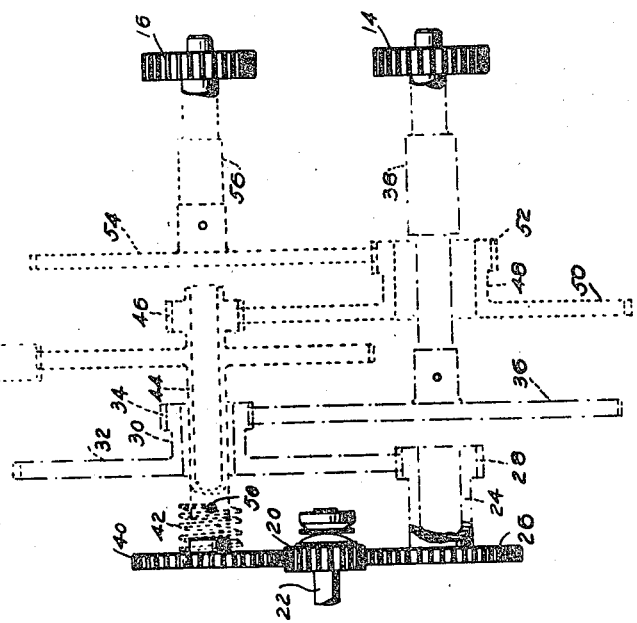
Fig. 3 is a schematic view illustrating the driving path through two driving trains leading to the ring gear of the driving motor.

Referring now in detail to the drawings and in particular to Fig. 4, a fragment of a continuous circular turret ring gear is shown at 10 and is provided with internal teeth 12. In an actual turret installation this ring gear is fixed to the tank hull and surrounds the turret space of the tank and is employed as a traction unit from which rotational movements of the turret in azimuth in opposite directions are attained. The lash-free mechanism comprising the present invention is schematically illustrated in Fig. 3 and includes a pair of driven gears 14 and 16, the latter gears being fragmentarily shown in Fig. 4 and constituting driving gears for the turret. These gears are in the form of relatively small spur gears having circumferential teeth 18 and 19 respectively formed on their peripheries and designed for meshing engagement with the teeth 12 internally formed on the ring gear 10. As will be made clear presently, the gears 14 and 16 constitute the output driving elements of a unitary gear assembly which is carried by and movable bodily with the rotatable turret structure.

Fig. 3 is useful in illustrating the basic principles of the present invention. In this figure, a gear 20 represents the output or driving gear associated with a reversible hydraulic motor M (Fig. 1). In the drawings, the details of construction of the motor M have not been disclosed and only the casing thereof is illustrated. No claim is made herein to any novelty associated with this motor and reference may be had to the above mentioned copending application for a full disclosure of the details of construction and operation of this motor. For present purposes it is deemed sufficient to point out that this motor is hydraulically controlled by the gun stabilizing system illustrated in the above mentioned application and is of the constant displacement reversible type and includes the reversible output driving gear 20 which is mounted on a drive shaft 22.

From the driving gear 20 to the ring gear 10 a direct drive gear train is established. The drive exists through a spool gear 24 having gear portions 26 and 28 formed thereon, a spool gear 30 having gear portions 32 and 34 formed thereon, a relatively large gear 36, shaft 38 and gear 14 to the ring gear 10. The gear 14, according to the present invention, is employed when turning in the direction indicated by the small arrow in Fig. 4 for driving the turret tractionally in the direction indicated by the large arrow associated with this gear and it is to be noted that such a drive is a direct and unyielding one.

From the driving gear 20 to the ring gear 10 there also exists a second and indirect driving gear train which includes the gear 16 and which is employed when the gear 16 is driven in the direction indicated by the small arrow for the purpose of driving the turret in the direction indicated by the large arrow associated with this gear. This latter gear train exists from the gear 20 through a gear 40, a relatively powerful coil spring 42, a sleeve 44, gear 46 formed on the sleeve, spool gear 48 including gear portions 50 and 52, gear 54, shaft 56 and gear 16 to the ring gear 10. The spring 42 is anchored at one end as at 58 to the sleeve 44 and at the other end to the gear 40 and thus this spring is interposed in the train of gears previously described between the gear 40 and the gear 46.

In the installation of the mechanism, the gear 40 is turned while the sleeve 44 is maintained stationary until such time as a fairly large degree of tension has been applied to the spring 42. The gear 40 is then slipped in place in mesh with the driving gear 20 and since this latter driving gear 20 is in mesh with the gear 26, which is coupled to the gear 14 mechanically, after the installation has been made the two driven gears 14 and 16 are yieldingly opposed to one another, the tendency for these two gears being to turn under the unwinding action of the spring 42 in opposite directions as indicated by the small arrows in Fig. 4. As a consequence, the teeth 18 on the gear 14 normally bear against the sides of the teeth 12 on the ring gear 10 in pressure areas indicated at $p$. Similarly, the teeth 19 on the driven gear 16 normally bear against the sides of the teeth 12 in pressure areas indicated at $p'$. Under these circumstances, equal and opposite applications of torque are made to the turret which balance or neutralize each other with the net result being that the two gears 14 and 16 at all times remain under tension so that any tendency for lash to occur will be taken up by the spring 42. However, the gear portion 32 of the spool gear 30 meshes with the driving gear portion 28 of the spool gear 24, thus effectively locking the two gears 14 and 16 against any relative motions that would normally tend to relieve the tension of the coil spring 42.

Referring now to Fig. 1 wherein the assembled lash-free mechanism is shown in detail, the entire gear drive assembly is assembled within an outer casing 60 which is bolted or otherwise secured in any suitable manner (not shown) to the wall or framework of the tank turret. The motor M is bolted as at 62 to the casing 60 exteriorly thereof and the shaft 22 thereof projects into the casing 60, thus presenting the driving gear 20 for mesh with the gear portion 26 of the spool gear 24 and with the gear 40.

The spool gear 24 is mounted upon the shaft 38 which extends longitudinally through the casing 60 at one side thereof and which is journaled at its end in anti-friction bearings 64 and in its medial regions in needle bearings 66. The spool gear 48, including the gear portions 50 and 52, is rotatably mounted upon the shaft 38 by means of needle bearings 68. One end of the shaft 38 projects completely through the casing 60 and has keyed thereto the driven gear 14 which is keyed to and secured in place on the end of the shaft by means of a nut 72 which is received on a threaded portion 74 of the shaft. The gear 36 is keyed as at 76 to the shaft 38.

The gear 40 is rotatably mounted upon the shaft 56, which, like the shaft 38, extends longitudinally through the casing 60 and is similarly journaled in end and needle bearings 78 and 80 respectively. Needle bearings 82 are interposed between the gear 40 and shaft 56. The sleeve 44 carried by the gear 46 is supported in anti-friction needle bearings 84 interposed between it and the shaft 56. The gear 54 is pinned as at 86 to the shaft 56. The driven gear 16 is keyed to and secured in place on the end of the shaft 56 by means of a nut 88 which is threadedly received on a threaded portion 90 of this shaft. An apron 92 formed on the casing 60 partially surrounds the two driven gears 14 and 16 and forms a protective enclosure therefor. The apron 92 is formed with a cut-away portion 94 exposing the teeth 19 and 18 on these gears for meshing engagement with the ring gear 10.

The coil spring 42 is relatively powerful and from the above description it will be seen that the same serves to place the two driven gears 14 and 16 under tension so as to take up all lost motion existing in the various gear trains. In the installation of the device, one or the other of the two gears 14 or 16, as the case may be, is rotated throughout a predetermined degree, while the other gear is maintained stationary and thus the spring 42 is placed under tension. When the proper predetermined degree of tension has been attained, the casing 60 is bolted in position or otherwise secured to a wall of the turret with the two driven gears 14 and 16 in complete mesh with the teeth on the ring gear 10, after which time the two driven gears 14 and 16 are at all times placed under tension in order that the pressure regions $p$ and $p'$ of Fig. 4 will be established with the gear 14 tending to force the turret to move in a clockwise direction, as viewed in Fig. 4, and with the gear 16 tending to move the turret in a counter-clockwise direction. This relationship between the two gears 14 and 16 is permanent and exists at all times during the operation of the device. Any slack normally existing between the two gears and extending back through the various gear trains will thus effectively be eliminated. When the turret is driven in a clockwise direction, as viewed in Fig. 4, the drive therefor is direct through the gear train associated with the shaft 38. When the turret is driven in a counter-clockwise direction the drive therefor occurs indirectly through the gear train associated with the shaft 56 and includes the coil spring 42 which is the principal element in the elimination of slack.

Still referring to Fig. 1, the casing 60 is provided with an extension 96 which rotatably supports therein a shaft 98 mounted in anti-friction bearings 100. The shaft 98 is operatively connected through a conventional wedge type driving clutch 102 to an operating handle 104, by means of which movements in either direction may be applied to the turret in a manner that will appear presently.

The shaft 98 is provided with a reduced portion 106 which is keyed as at 108 to one element 110 of a clutch assembly 112. The clutch element 110 is provided with a series of teeth 114 thereon designed for cooperation with counterpart teeth 116 provided on a second clutch element 118. This latter clutch element 118 is loosely mounted upon the reduced portion 106 of the shaft 98 and cooperates with a pressure ring 120 in applying torque to a gear rim 122 surrounding the members 118 and 120 through the application of friction. Toward this end, a spring 124 surrounds the clutch element 118 and bears at one end against an adjustable nut 126 threadedly received on the member 118 and at the other end against the pressure member 170. By adjusting the position of the nut 126 the degree of frictional pressure applied to the gear 122 may be varied. The gear 122 meshes with a gear 128 integrally formed on the sleeve 44, thus establishing a driving connection from the handle 104 into the turret driving gear mechanism.

The clutch 112 is adapted to be electromagnetically operated and is controlled by means of an electromagnet designated in its entirety at 130. This clutch is, during manipulation of the handle 104, normally maintained in engagement, such engagement being made possible by deenergization of the electromagnet 130. Accordingly, the electromagnet 130 is provided with a winding 132 and a shiftable core 134. The core 134 is provided with a conical surface 136 adapted when the winding 132 is energized to bear against a complementary conical surface 138 to limit the movement of the core 134. The winding 132 of the electromagnet 130 is disposed within a chamber 140 provided in the extension 96 and the core 134 thereof is keyed as at 142 to the clutch element 110. A coil spring 144 surrounds the clutch element 110 and normally urges the core 134 to a position wherein the teeth 114 and 116 of the clutch assembly 112 are engaged. When the electromagnet 130 becomes energized the entire core 134 is shifted to the left, as viewed in Fig. 1, to disengage the clutch 112 so that the clutch element 118 and its associated parts, including the gear 122, will ride freely on the shaft 98 without disturbing the latter. During such disengagement of the clutch 112 the coil spring 144 will remain under compression.

No electrical circuit diagram for the electromagnet 130 has been disclosed nor is one deemed necessary, it being sufficient to state that during tank maneuvers under the control of the motor M the electromagnet 130 will remain continuously energized in order that the clutch 112 shall remain disengaged. In this manner, during rotation of the turret in one direction or the other, any motion imparted to the gear 122 will not be transmitted to the shaft 98. When it is desired to control the movements of the turret manually, as for example, upon failure of the power system, the electromagnet 130 will be deenergized, thus engaging the clutch 112 so that a drive will exist from the handle 104 through the one-way clutch 102, shaft 98 and reduced portion 106 and from thence through the clutch elements 110 and 118 to the gear 122 which meshes with the gear 128. The drive continues from the gear 128 and sleeve 44 on which it is formed through gears 46, 50, 52, 54, shaft 56 and driven gear 16. The driving connection from the handle 104 to the driven gear 16 exists when the turret is moved in one direction by the application of torque to the handle in a corresponding direction. If the turret is to be rotated by means of the handle 104 in the opposite direction, the driving connection will exist from the handle 104 through the clutch 102, shaft 98, and reduced portion 106, clutch 112, gear 122, gear 128 and sleeve 44, lost motion take-up spring 42, gears 40, 20, 26, 28, 32, 34, 36, shaft 38 and driven gear 14.

During manipulation of the handle 104, should at any time a back-lash occur, as for example, a back-lash created by tilting of the entire tank to the right or to the left so that the unbalanced weight of the turret guns would apply a strong torque tending to rotate the turret, or should the turret strike a stationary object in such a manner as to apply a turning torque to the turret, the clutch 102 affords the operator protection in that motion of the shaft 98 will not be transmitted through this clutch to the handle 104. The members 118 and 120, in combination with the gear 122, constitute a friction clutch so that if at any time a strong external turning force is applied to either the turret or to the handle 104 a slippage of these parts will result, thus preventing damage to the equipment.

Means are provided whereby the core 134 of the electromagnet 130 may be manually retracted or advanced to cause disengagement or engagement of the clutch 112, as the case may be. Toward this end, the core 134 has associated therewith a rod or extension 150 which projects outwardly through an end of the casing extension 96, and has associated therewith a packing gland 152. A control knob 154 is carried at the outer end of the rod 150 and is adjustable thereon by means of a set screw 156 which cooperates with a thread-like groove 158 formed in the end of the rod 150. The set screw and groove 156, 158 form a convenient means whereby the clutch 112 may be adjusted for maximum efficiency of operation. Upon failure of the electromagnet 130 due to any reason whatsoever, as for example, failure of the same to become energized, the control knob 154 may be pulled outwardly away from the casing, thus disengaging the clutch 112 and permitting the turret to be driven in the normal manner from the motor M. A spring detent 160 secured to the casing cooperates with a groove 162 formed in the rod 150 to maintain the clutch 112 disengaged. The rod 150 and control knob 154 may also be employed to assist the electromagnet 130 in its functions should there be any tendency for the various parts of the mechanism to respond to initial energization of the electromagnet 130.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention. It is the invention, therefore, to be limited only as indicated by the scope of the following claims.

What is claimed is:

1. A lash-free traction gear reduction driving mechanism for imparting relative turning movements between a vehicle and a turret rotatably mounted thereon comprising a ring gear on one of said members, a casing fixedly secured to the other member and including a turret driving shaft rotatably journaled in the casing and projecting outwardly therefrom, a driving gear mounted on said shaft exteriorly of the casing and meshing with said ring gear, a second turret driving shaft rotatably mounted in the casing and projecting outwardly therefrom, a second driving gear mounted on said second shaft exteriorly of the casing and also meshing with said ring gear, a gear rotatably mounted on said second shaft, a spring having one end thereof anchored to said latter gear, gear reduction means operatively connecting the other end of said spring to said second turret driving shaft, a reversible motor having a motor shaft, means operatively connecting said motor shaft to said gear on the second turret driving shaft, and gear reduction means operatively connecting said motor shaft to said first turret driving shaft.

2. A lash-free traction gear reduction driving mechanism for imparting relative turning movements between a vehicle and a turret rotatably mounted thereon comprising a ring gear on one of said members, a casing fixedly secured to the other member and including a turret driving shaft rotatably journaled in the casing and projecting outwardly therefrom, a driving gear mounted on said shaft exteriorly of the casing and meshing with said ring gear, a second turret driving shaft rotatably mounted in the casing and projecting outwardly therefrom, a second driving gear mounted on said second shaft exteriorly of the casing and also meshing with said ring gear, a gear rotatably mounted on said second shaft, a spring having one end thereof anchored to said latter gear, gear reduction means operatively connecting the other end of said spring to said second turret driving shaft, a reversible motor having a motor shaft, means operatively connecting said motor shaft to said gear on the second turret driving shaft, gear reduction means operatively connecting said motor shaft to said first turret driving shaft, a manually operable drive shaft, gear reduction means operatively connecting said manually operable drive shaft and said second turret driving shaft in driving relationship, and a clutch for rendering said connecting means inoperative.

3. A lash-free traction driving mechanism for imparting relative turning movements between a vehicle and a turret rotatably mounted thereon comprising a ring gear fixedly secured to one of said members, a casing fixedly secured to the other member, a turret drive shaft rotatably journaled in the casing and projecting outwardly therefrom, a driving gear mounted on said shaft exteriorly of the casing and meshing with said ring gear, a second turret driving shaft rotatably mounted in the casing and extending parallel to said other shaft and projecting outwardly from the casing, a second gear on said second driving shaft exteriorly of the casing and also meshing with said ring gear, a driving gear for said second turret driving shaft rotatably mounted on the latter in coaxial relationship, a coil spring surrounding said second turret driving shaft and having one end thereof anchored to said latter gear, gear reduction means operatively connecting the other end of said spring to the second turret driving shaft whereby said latter two members are yieldably coupled in driving relationship, a reversible motor exteriorly of the casing and having a driving shaft projecting into the casing, a gear mounted on and secured to said first turret driving shaft, and a gear mounted on said motor driving shaft and meshing with each of said driving gears.

WARD LEATHERS.
LAWRENCE BRUEHL.

REFERENCES CITED

The following references are of record in the file of this patent:

UNITED STATES PATENTS

| Number | Name | Date |
| --- | --- | --- |
| 1,319,194 | Walker | Oct. 21, 1919 |
| 1,438,878 | Tomassette | Dec. 12, 1922 |
| 1,496,867 | Bee | June 10, 1924 |
| 1,949,643 | Bannan | Mar. 6, 1934 |
| 2,322,719 | Scott | June 22, 1943 |
| 2,336,307 | Slye | Dec. 7, 1943 |
| 2,400,385 | Blaylock | May 14, 1946 |

FOREIGN PATENTS

| Number | Country | Date |
| --- | --- | --- |
| 45,910 | Denmark | Dec. 24, 1928 |